(12) United States Patent
Cribb

(10) Patent No.: US 6,467,712 B1
(45) Date of Patent: Oct. 22, 2002

(54) FISHING REEL

(76) Inventor: Harry L. Cribb, 225 Oak St., Lake City, SC (US) 29560

( * ) Notice: Subject to any disclaimer, the term of this patent is extended or adjusted under 35 U.S.C. 154(b) by 0 days.

(21) Appl. No.: 10/137,143

(22) Filed: May 1, 2002

Related U.S. Application Data

(60) Provisional application No. 60/293,252, filed on May 24, 2001.

(51) Int. Cl.[7] .................. A01K 89/00; A01K 89/01; A01K 89/015
(52) U.S. Cl. .................................................. 242/322
(58) Field of Search ................. 242/322, 530, 242/530.1, 530.2, 530.3; 254/278

(56) References Cited

U.S. PATENT DOCUMENTS

| | | | | |
|---|---|---|---|---|
| 4,076,185 A | * | 2/1978 | Dorph | 242/118.41 |
| 4,215,829 A | * | 8/1980 | Boyllin | 242/375 |
| 4,520,999 A | * | 6/1985 | Philips et al. | 254/266 |
| 4,635,755 A | * | 1/1987 | Arechaga | 185/45 |
| 4,715,554 A | * | 12/1987 | Kuntze | 242/118.4 |
| 5,507,443 A | * | 4/1996 | Miyazaki | 242/322 |
| 5,911,378 A | * | 6/1999 | Plestan | 242/231 |
| 6,412,724 B1 | * | 7/2002 | Ferrara | 242/317 |

* cited by examiner

*Primary Examiner*—Emmanuel Marcelo
(74) *Attorney, Agent, or Firm*—Leatehrwood Walker Todd & Mann, P.C.

(57) ABSTRACT

A fishing reel having a main spool for dispensing fishing line for casting during fishing. A second reserve spool, or bobbin, is provided for dispensing a reserve amount of fishing line to the main spool through a passage in the main spool. The main spool defines a cavity, and a portion of the reserve spool is carried substantially within such cavity. In one embodiment, the main and reserve spools rotate with one another, being locked together with a releasable locking device. In another embodiment, the relative motion between the main and reserve spools in controlled by a friction drag arrangement. In the event additional line is needed on the main spool, line can be drawn through the passage in the main spool from the reserve spool through relative rotation of the reserve spool with respect to the main spool.

23 Claims, 15 Drawing Sheets

FISHING REEL

This application claims benefit of U.S. Provisional application Ser. No. 60/293,252, filed May 24, 2001, the entirety of the disclosure of which is incorporated herein by reference thereto.

BACKGROUND OF THE INVENTION

This invention relates generally to a fishing reel having a reserve line associated with the main spool of the reel.

The present invention includes a novel reserve line bobbin for open-faced spinning reels and baitcast reels. More specifically, the new reserve line bobbin is incorporated within the spool of the reels. The purpose of the new bobbin is to make more efficient use of the fishing line by providing a reserve space for a portion of the line not required for casting in a particular fishing application.

The present invention applies particularly well to the recently available small diameter, high strength microfilament or micro-fiber lines, some of which may be braided. These lines are small in diameter in comparison to the more conventional monofilament lines that have been in general use for a long period of time. The literature on the braided lines commonly compares the diameter of a particular strength of line to a monofilament line of approximately the same diameter which has a much lower breaking strength. The following are representative ratios: 10 lb./2 lb., 20 lb./5 lb., 30 lb./6 lb., etc. The small diameter of the braided lines makes it possible to store long lengths of line inside of the main spool on the reserve bobbin. In general, the lighter lines would be used on smaller reels requiring smaller spools and bobbins, heavier lines would be used on larger reels requiring larger spools and bobbins.

Another property of the braided lines that makes the interior reserve line bobbin feasible is low memory. This allows the line to be wound tightly on a small diameter spool or bobbin and still be useful when it is retrieved. This would likely not be the case with monofilament lines which would take a set and would tend to be coiled when pulled from the spool or bobbin. The monofilament lines would also tend to spring away from the spool or bobbin and could cause interior tangles.

Use of reels incorporating the present invention would allow much more efficient use of the braided lines. Many problems occur with the line beyond the length of line normally cast from the spools on both open-faced spinning reels and on baitcast reels. On the open-faced reels, loops of line sometimes pull from deep in the lay of line on the spool, causing major tangles. The line is usually discarded when major tangles occur. On the baitcast reels, overrun (commonly referred to as backlash) can cause line tangles very deep in the spool, far beyond casting distance. The limited amount of line on the main spool permitted with the incorporation of the reserve bobbin of the present invention mitigates these problems.

The reserve line bobbin of the present invention is also useful for replenishment of the line on the main spool due to loss of line from normal wear and repeated tying on of lures.

The efficient use of braided lines made possible by the reserve line bobbin of the present invention would make the lines much more cost effective, since the cost of braided lines is roughly two to five times the cost of monofilament lines.

Accordingly, there exists a need for a system for allowing lightweight braided line to be used in a manner which preserves the line and minimizes waste thereof.

SUMMARY OF THE INVENTION

It is, therefore, an object of the present invention to provide a reel having a reserve amount of line.

Another object of the present invention is to provide a reel having a reserve line bobbin.

Yet another object of the present invention is to provide a reel having a reserve line bobbin which is carried in the interior of the main spool of a reel.

A further object of the present invention is to provide a reserve line spool configured for use on conventional reels.

A still further object of the present invention is to provide a method of providing a reserve amount of line to a reel.

Yet a further object of the present invention is to provide a spool configuration having a first portion of line, and a second, major, portion of the line in reserve.

Another object of the present invention is to minimize the amount of line exposed on a spool during casting.

A still further object of the present invention is to provide a fishing reel for minimizing wasting of line when fishing in tight, restricted areas that interfere with casting.

Another object of the present invention is to provide for more efficient use of the braided lines by storing a portion of the line on the interior of the main spool where it would not be subject to tangles and damage, and wherein line could be retrieved and applied to the main spool as required.

The present invention includes the use of a second (or auxiliary) spool, also referred to herein as a reserve bobbin, carried inside of or adjacent to the spool of an ordinary fishing reel, such as an open-end fishing reel, or a baitcast reel. This allows for a more shallow spool to be used, which in turn exposes only a minimum amount of line to tangles and breakage.

The reserve bobbin need only pay out line as necessary when the line on the main spool becomes shortened to a less than desirable length. In one configuration, the main spool may hold fifteen yards or so, with the reserve bobbin holding approximately eight-five yards. This would give the user a total of one hundred yards of line to use, but would only expose fifteen yards or so of line at any given time. On smaller reels, a larger diameter main spool could be used in order to accommodate a bobbin having the desired reserve capacity.

The main spool and bobbin of the present invention can be designed to fit conventional reels, and could come in a variety of sizes and shapes.

By reducing the length of line required on the main spool, the reserve bobbin of the present invention reduces the potential for loss of a large amount of line due to the pulling off of line deeper into the winding of line on the spool than is required by the cast. This situation is fairly common with open-faced spinning reels, and generally results in the entangling of the line. The reserve bobbin also reduces the required depth, and accordingly, the front lip height of the main spool, which in turn, reduces resistance when the line is being pulled from the spool during the cast, since the line does not have to engage and flex around a front lip of larger height. This should result in easier and longer casts of a lure.

In order to pay out line from the reserve bobbin to the main spool, a locking device, such as a screw, pin, clip, etc., is released. This allows for rotation of the reserve bobbin with respect to the main spool. During normal operation, the reserve bobbin is locked to, or allowed to move only slightly relative to, the main spool with the locking device to rotate with the main spool during casting and reeling in of the line.

Through release of the locking device, the main bobbin is able to pay out line to the main spool, through a passage or opening in the main spool, when additional line is needed on the main spool. After this additional line is payed out, the locking device is engaged to again cause rotation of the bobbin with the main spool.

A drag interface system could be provided on the bobbin. Such a drag system could be a modified conventional drag system, a spring washer, a spring-biased washer, etc., which would provide friction against the bobbin, and accordingly, resistance to the line being pulled from the bobbin. The line would be removed from the bobbin upon applying a predetermined force to the line.

Alternately, the locking device could be only partially disengaged from the bobbin in order to provide frictional resistance (and thus drag) to rotation of the bobbin. The amount of resistance for a drag system should be such that inadvertent removal of line from the bobbin when all line is cast from the spool would be fairly restricted, but not so much that intentional removal of line for replenishment would be overly difficult. In determining the proper drag, it is noted that it takes less force to pull the line directly from the bobbin than it takes to pull the line through the line guides of the fishing rod bent under stress.

The reserve bobbin thus increases line use efficiency by allowing the line on the main spool to be replenished, through the selective-pulling of line through the opening in the main spool from the reserve bobbin. The line on the main spool can be replenished as required, such as when the line is shortened due to tying knots, breakage, wear, etc.

The present invention also provides a method of providing a reserve amount of line to a fishing reel.

The use of the reserve bobbin is particularly suitable for use with the newer small diameter, high strength, braided lines. The braided lines generally have low memory, which allows them to be wound tightly on the reserve bobbin, while still being useful when pulled out and wound on the main spool. Increasing the usage of the braided line is particularly desirable for cost reasons, since the braided line may cost several times more than ordinary monofilament line.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which.

DESCRIPTION OF THE PREFERRED EMBODIMENT

Figure 1:
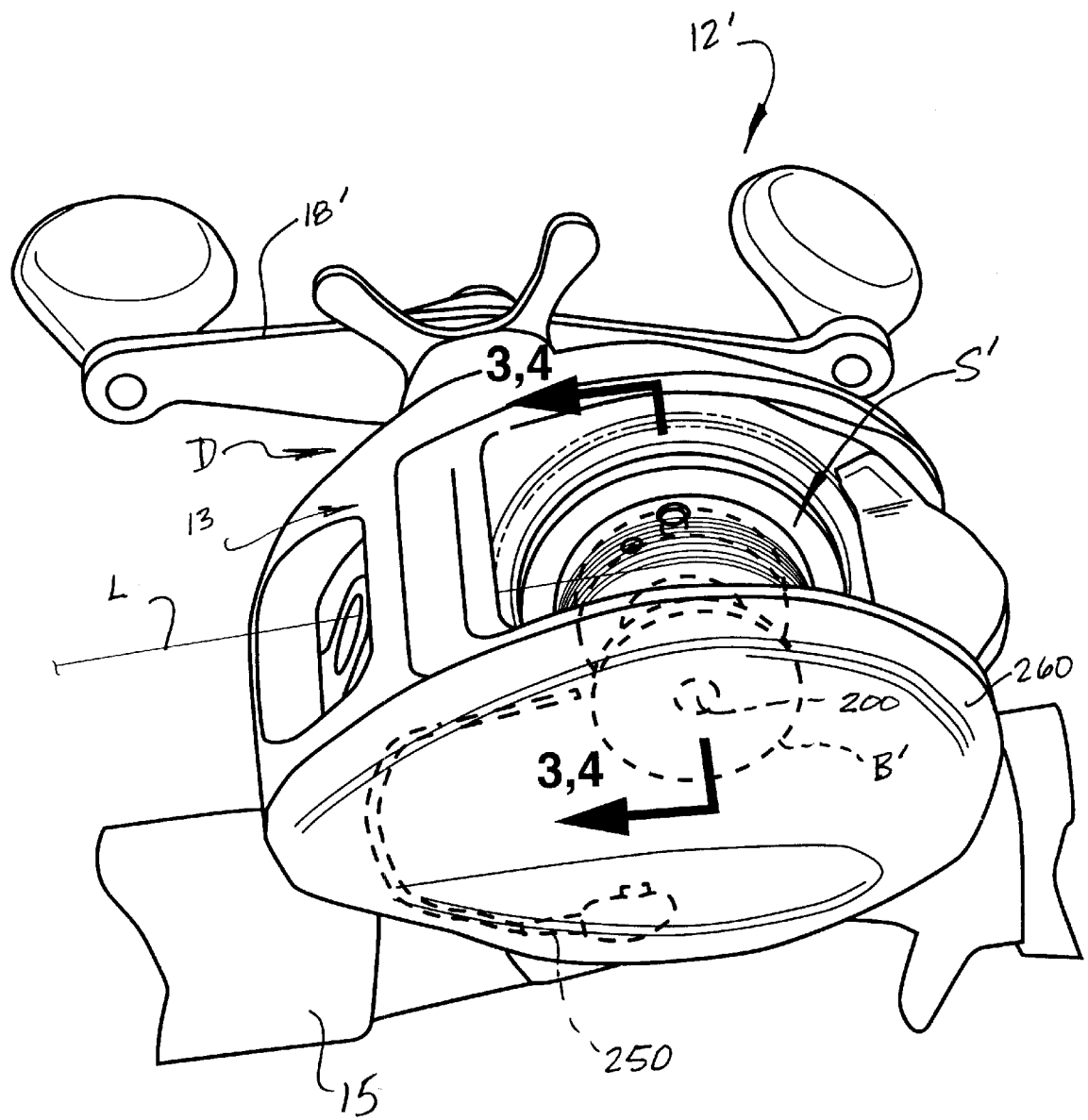
FIG. 1 is a perspective view of a bait cast reel constructed in accordance with the present invention.

The accompanying drawings and the description which follows set forth this invention in its preferred embodiment. However, it is contemplated that persons generally familiar with fishing gear will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the fishing reel of the present invention is indicated generally in the figures by reference character 10.

It is also to be understood that the full disclosure of my provisional patent application Serial No. 60/293,252, filed May 24, 2002 is incorporated herein in its entirety by reference.

The present invention is shown herein in use with open face (also known as open end) reels and with bait cast reels. The reels depicted in the drawings and discussed herein are for illustrative purposes and could be of a variety of other configurations while still being encompassed by the present invention.

Figure 5A:
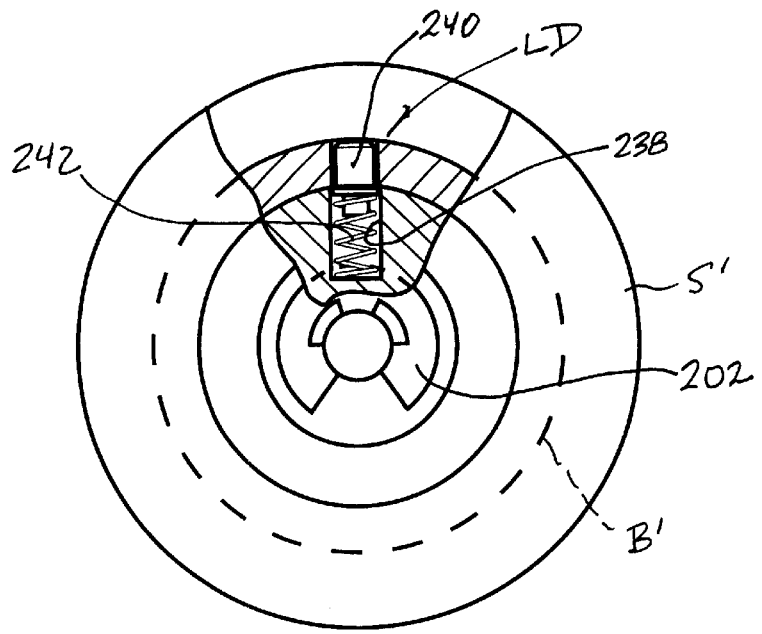
FIG. 5A is a sectional view taken along lines 5A—5A of FIG. 4.
Figure 5B:
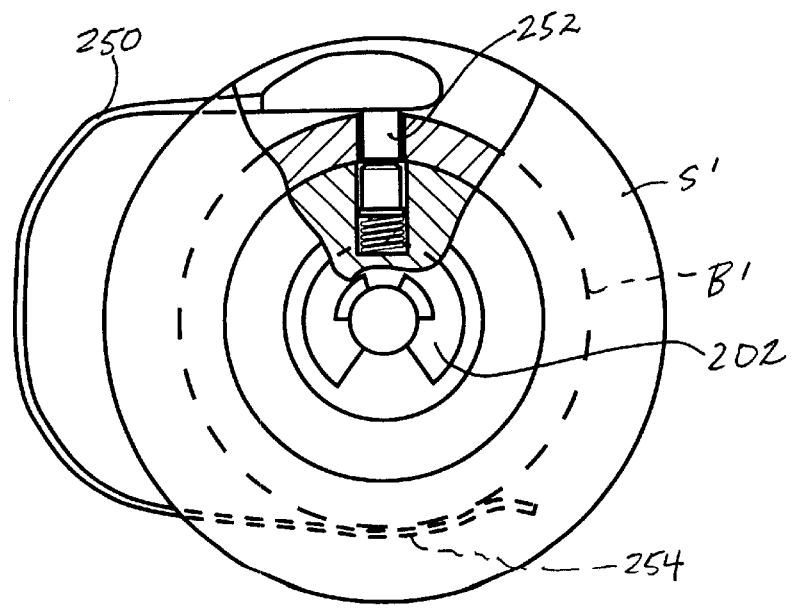
FIG. 5B is a sectional view taken along lines 5B—5B of FIG. 4 illustrating use of a clip for use in connection with the reserve bobbin.
Figure 6:
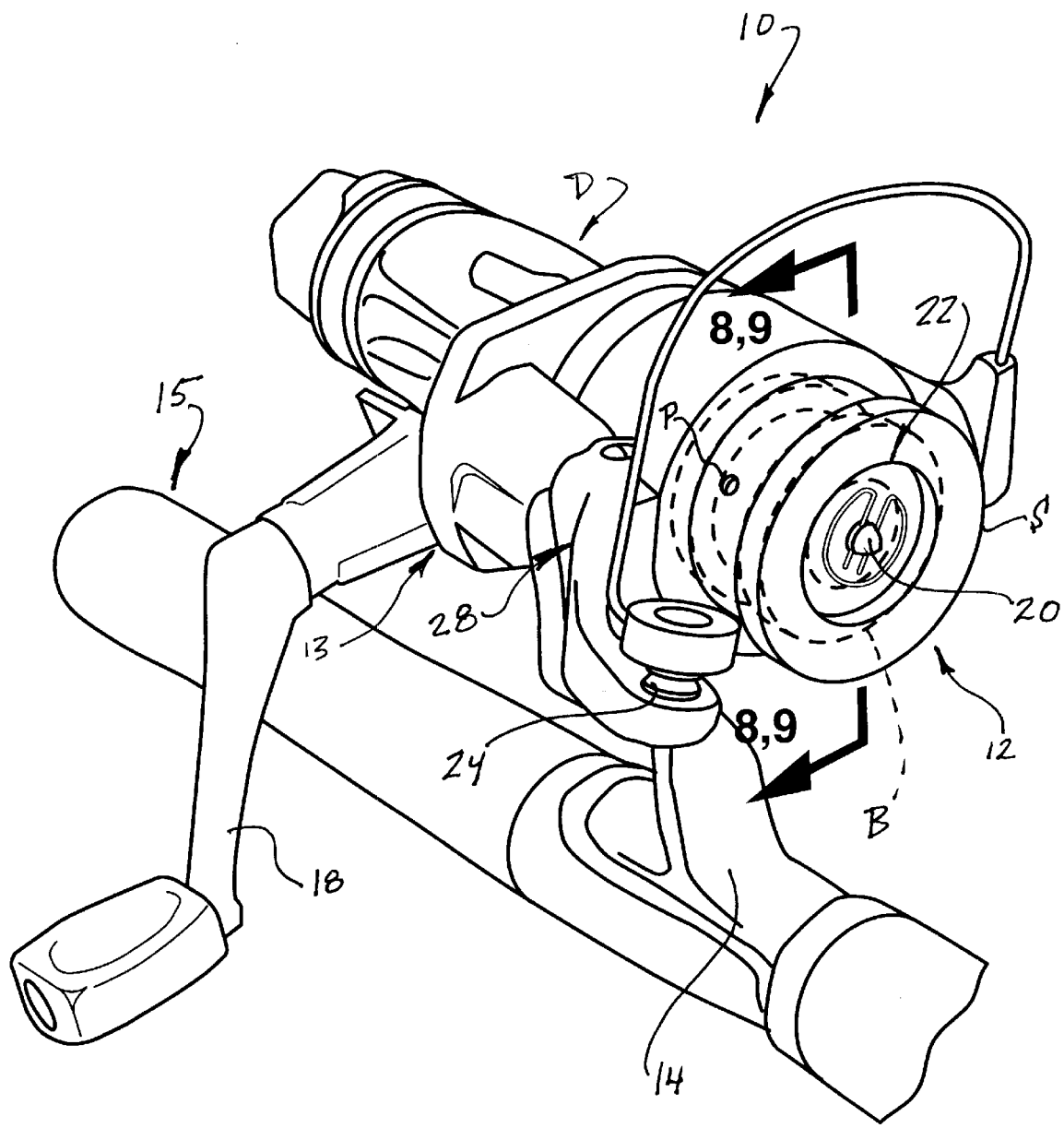
FIG. 6 is a perspective view of an open-face spinning reel constructed in accordance with the present invention.

Versions of the present invention as applied to a bait reel are shown in FIGS. 1 through 5B, and 15 through 19, and versions of the present invention applied to an open face reel are shown in FIGS. 6 though 14.

Turning first to application of the present invention 10 to an open face reel, such is shown in FIG. 6. Open face reel 12 has a support structure, generally 13, with a base 14 which is attached in a conventional manner to a fishing rod, generally, 15. A conventional crank 18 and drive mechanism, generally D, is provided in the reel for translating rotation of the crank 18 into rotation of the main shaft 20 of the reel 10. Reel 10 includes a rotor assembly, generally 22, having a line roller 24 on which line, generally L, (FIG. 8) passes from a main spool, generally S, and a second spool, or, reserve line bobbin, generally B.

A bail holder 28 is provided for holding a conventional bail, the bail being movable between one position to allow for free spinning of the main spool S during casting, and another position for allowing the line to be reeled in and wound upon main spool S by turning of crank 18.

Figures 7, 7A:
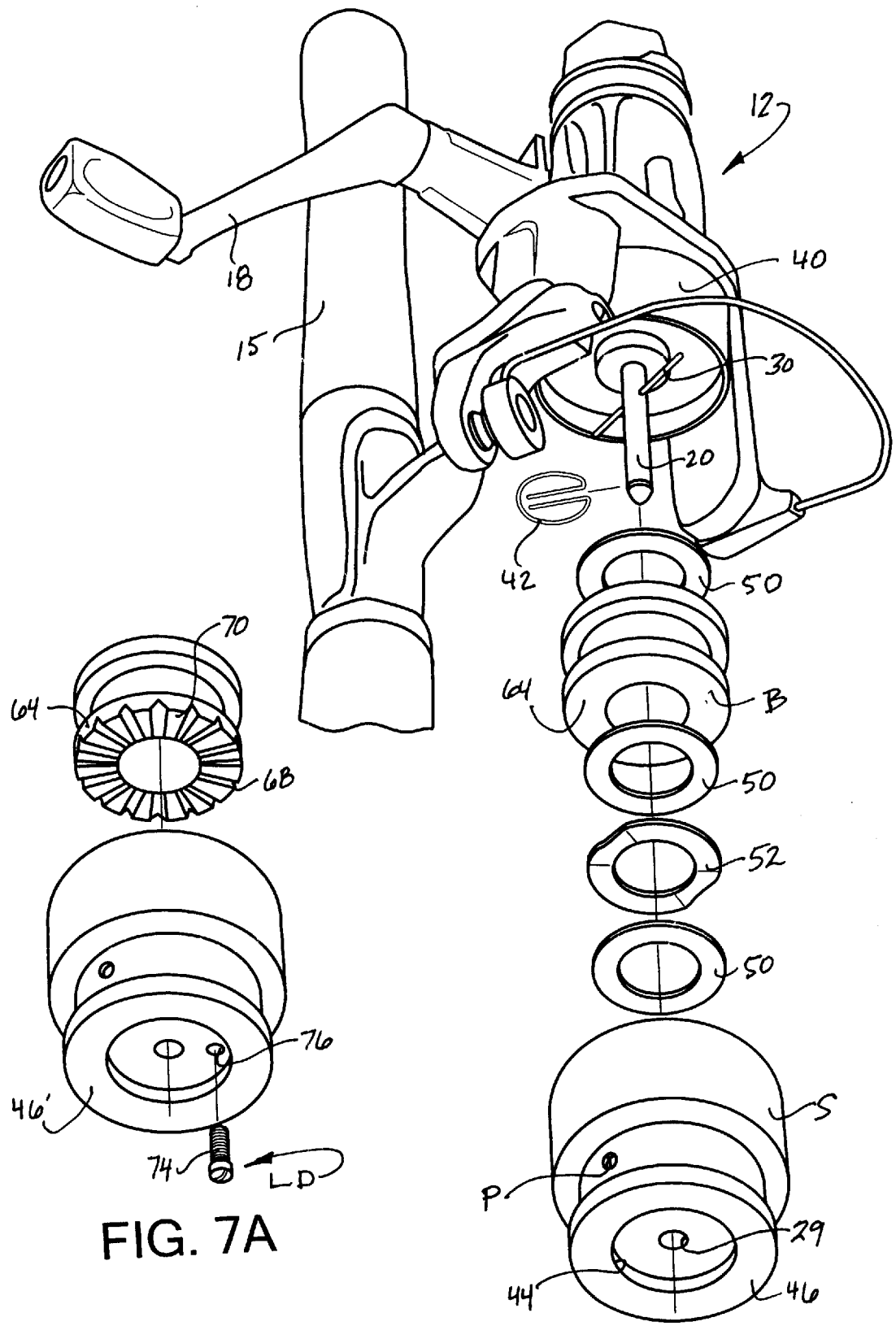
FIG. 7 is an exploded view of the open-face reel illustrated in FIG. 6.
FIG. 7A is an exploded view of an alternate embodiment open-face reel spool and reserve bobbin constructed in accordance with the present invention.
Figure 8:
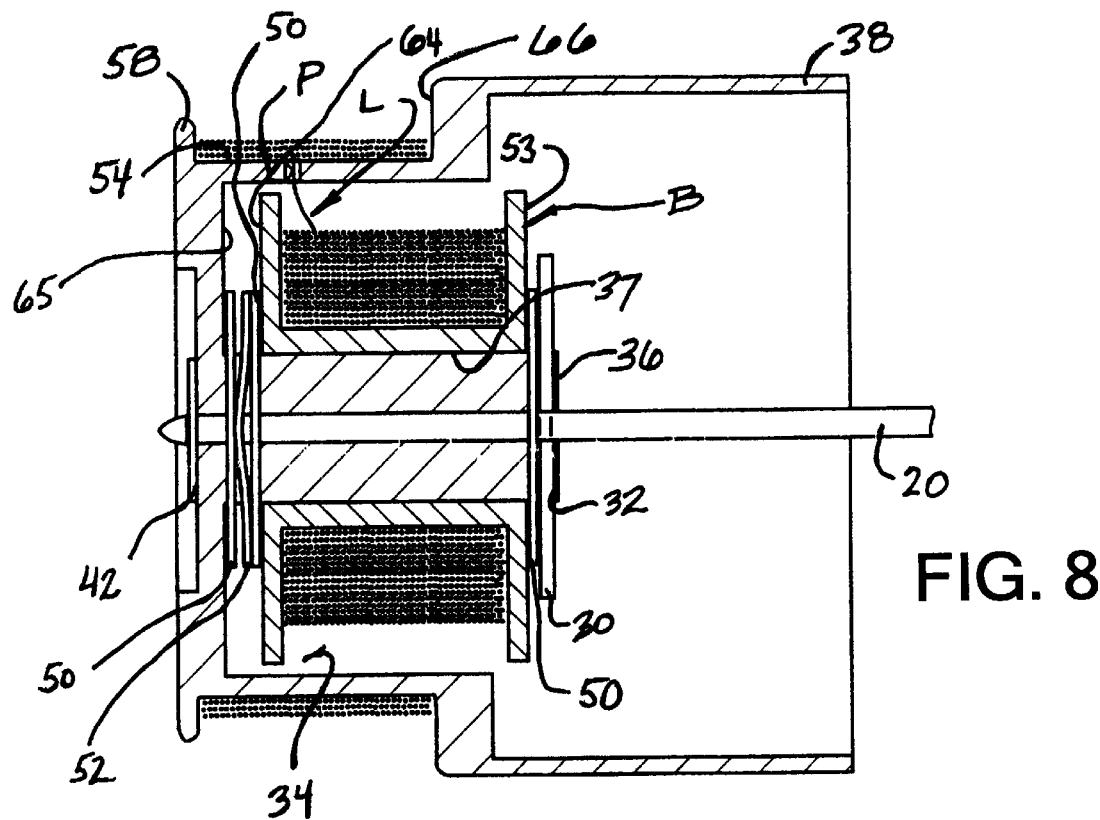
FIG. 8 is a sectional view taken along lines 6—6 of FIG. 6 illustrating an alternate embodiment open-face reel spool and reserve bobbin constructed in accordance with the present invention.

As shown in FIG. 7, spool S has a bore 29 for receiving main shaft 20 and is locked to main shaft 20 of reel 10 with a pin 30. Pin 30, as shown in FIG. 8, is carried within a slot 32 of a boss 36 provided on spool S. Bobbin B has a bore 37 which receives boss 36, and pin 30 also serves to capture bobbin B within a cavity, generally 34, of spool S. A skirt 38 extends rearwardly from spool S and rotates about a generally cylindrical wall 40 (FIG. 7) of rotor assembly 22.

A clip 42 is provided within a recess 44 in the forward face 46 of spool S. Clip 42 attaches to main shaft 20 to retain the spool S and, in turn, bobbin B, on shaft 20 of reel 10. Washers 50 are provided about boss 36 in order to properly space bobbin B from pin 30. A spring washer 52, preferably constructed of stainless steel, is also provided between washers 50 to apply pressure to bobbin B and to form a drag interface in order to apply a drag to bobbin B to prevent overrun of bobbin B when line L is pulled from bobbin B through passage P of spool S. An additional washer 50 is provided between the base 53 of bobbin B and pin 30, as shown in FIGS. 7 and 8.

FIG. 8 also illustrates line L wound about the barrel shaped surface 54 of spool S between a forward lip 58 and a rearward shoulder 60. Note that the depth of the windings of line L on spool S is much more shallow than the depth of the windings of line L on the cylindrical winding surface 62 of bobbin B. Winding surface 62 is bound by a forward flange 64 and a rearward flange 66 of bobbin B.

In the embodiment of the present invention shown in FIGS. 6, 7, and 8, relative movement of bobbin B with respect to spool S is restricted by the drag, or frictional forces, between the face 64 of bobbin B, washers 50, spring washer 52, and the inner face 65 of spool S. The amount of drag between these components, and, accordingly, the resistance to the line L being pulled from the bobbin, can be varied through use of one or more spring washers 52 and/or one or more washers 50 in combination with one or more spring washers 52. In other words, the present invention is not to be limited to the particular washer/spring washer configurations shown herein, since the arrangement of those items may vary from application to application.

The amount of resistance for a drag system should be such that inadvertent removal of line from the bobbin when all line is cast from the spool would be fairly restricted, but not so much that intentional removal of line for replenishment would be overly difficult. In determining the proper drag, it is noted that it takes less force to pull the line directly from the bobbin than it takes to pull the line through the line guides of the fishing rod bent under stress.

Figure 9:
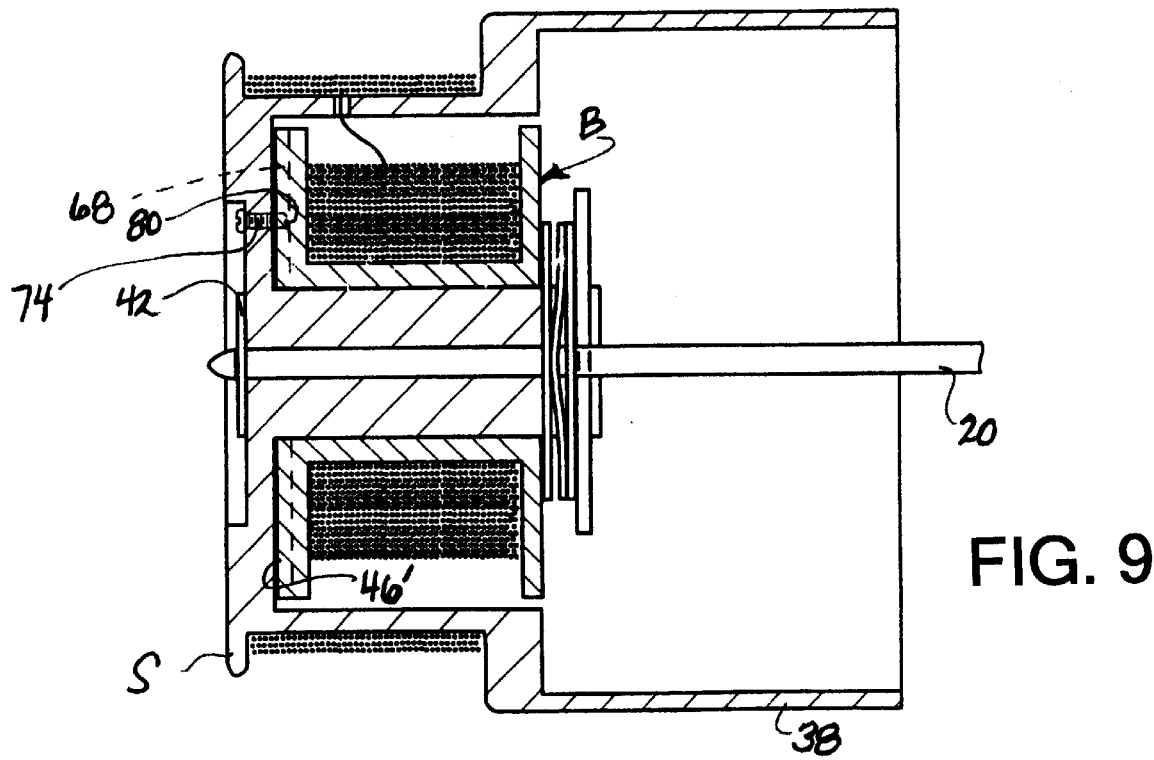
FIG. 9 is a sectional view taken along lines 9—9 of FIG. 6.
Figure 10:
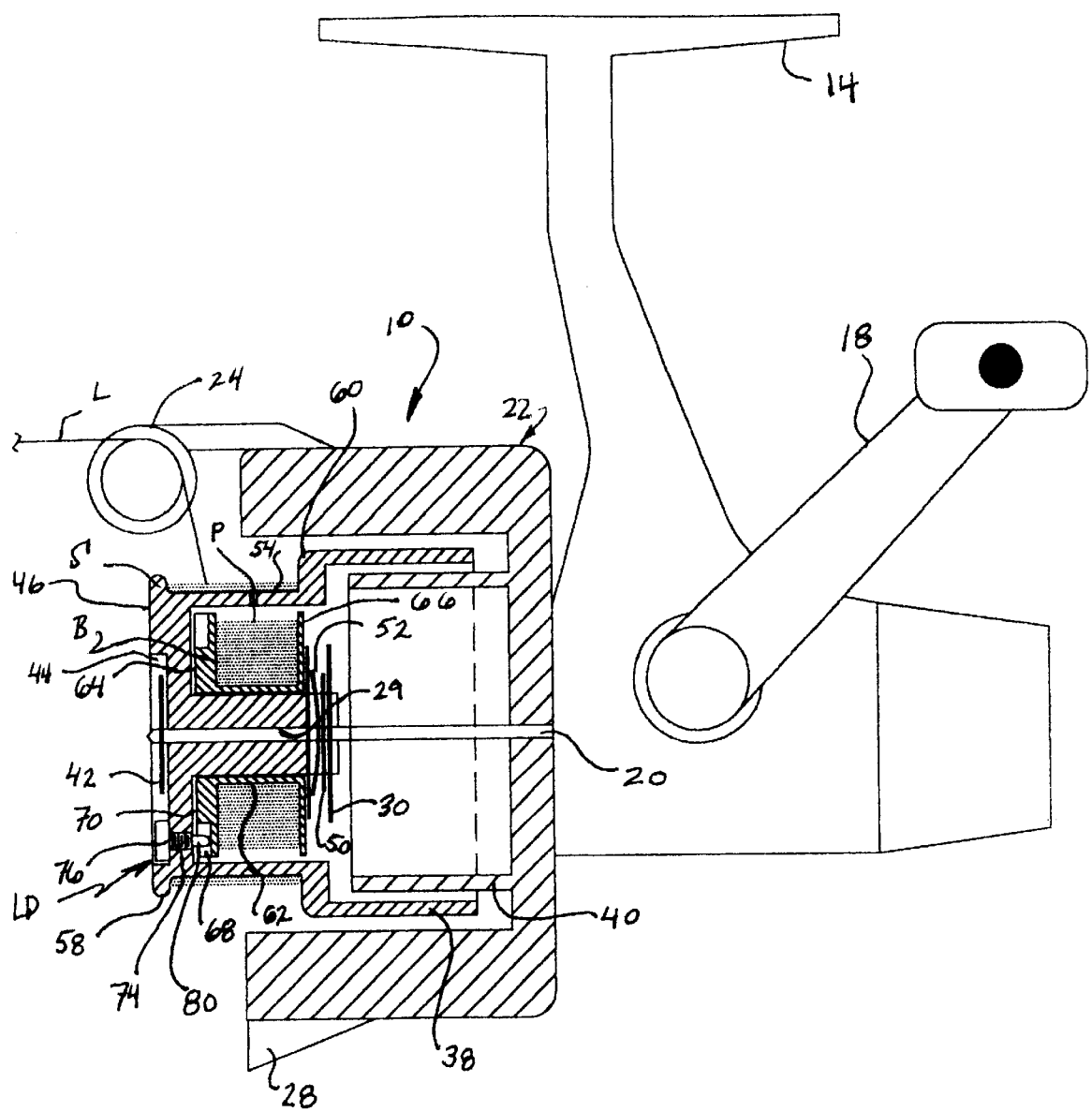
FIG. 10 is a sectional view of a further alternate embodiment of an open-face reel spool and reserve bobbin constructed in accordance with the present invention.

Forward flange 64' of bobbin B, in the embodiments shown in FIGS. 7A, 9, and 10, includes V-shaped grooves, generally 68, radially spaced about the periphery of the face 70 of forward flange 64.

As shown in FIGS. 7A and 9, locking device, generally LD, is provided on reel 12 for selectively locking the rotation of bobbin B with respect to spool S. In the embodiment shown in FIGS. 7A and 9, the locking device is a screw 74, which is threadingly received within a threaded opening 76 provided in the face 46' of spool S. As shown in FIG. 9, the screw 74 is in a locking position, the forward end 80 thereof engaging with a V-shaped groove 68 of bobbin B, to prevent relative rotation of bobbin B with respect to spool S. In this configuration, the line L on bobbin B does not pay out when the line L is cast, such as in the casting of a lure (not shown), but instead stays wound on bobbin B.

When screw 74 is rotated such that the forward end thereof no longer engages with a groove 68 of bobbin B, bobbin B may freely rotate with respect to spool S, and this allows line L to be pulled from reserve bobbin B in those instances where additional line is required to be wound on the barrel shaped surface 54 of spool S.

Figure 11:
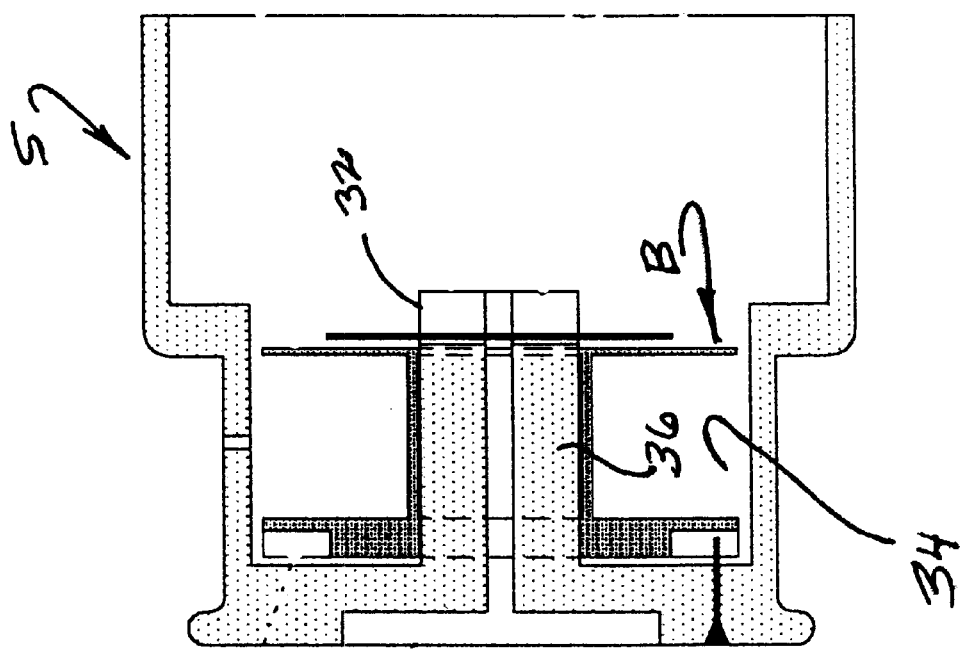
FIG. 11 is a sectional view of another alternate embodiment of an open-face reel spool and reserve bobbin constructed in accordance with the present invention.
Figure 12:
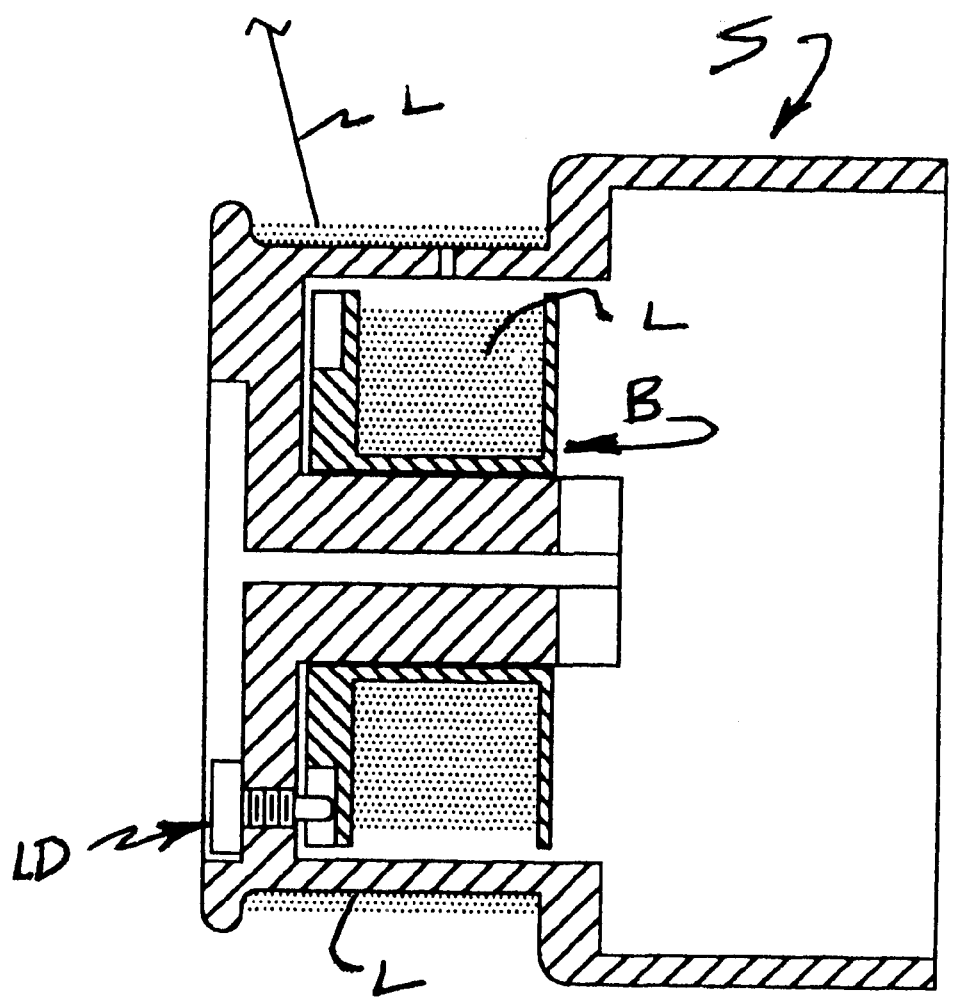
FIG. 12 is a sectional view of a further alternate embodiment of an open-face reel spool and reserve bobbin constructed in accordance with the present invention.

FIGS. 10, 11, and 12 illustrate variations of locking device LD, wherein screws 90, 90a, and 90b, respectively, are used for engaging with screw 68 of bobbin B.

In one preferred embodiment, spool S is approximately 1 ½ inches in length, and approximately 1 $1/16^{th}$ inches in diameter. The thickness of lip 58 is approximately $5/64^{th}$ inches, as is also the height of lip 58. The length of boss 36 is approximately $21/32^{nd}$ inches in length, and boss 36 is $3/8^{th}$ inches in diameter. The length by which skirt 38 extends beyond boss 36 is also approximately $21/32^{nd}$ inches. The recess 44 in the face of spool S is approximately ¾ inches in diameter, and the diameter of the forward portion of spool S, inclusive of lip 58, is approximately 1½ inches in diameter. The diameter of the barrel shaped surface 54 is approximately $15/16^{th}$ inches in diameter, and its width is approximately $39/64^{th}$ inches.

All of the foregoing dimensions are an example of one preferred embodiment of a spool S constructed in accordance with the present invention, and it is to be understood that such dimensions could vary widely from application to application. The diameter of the spool can be as large as reasonable for the strength and characteristics of the material used and the thickness of such material.

Figure 13:
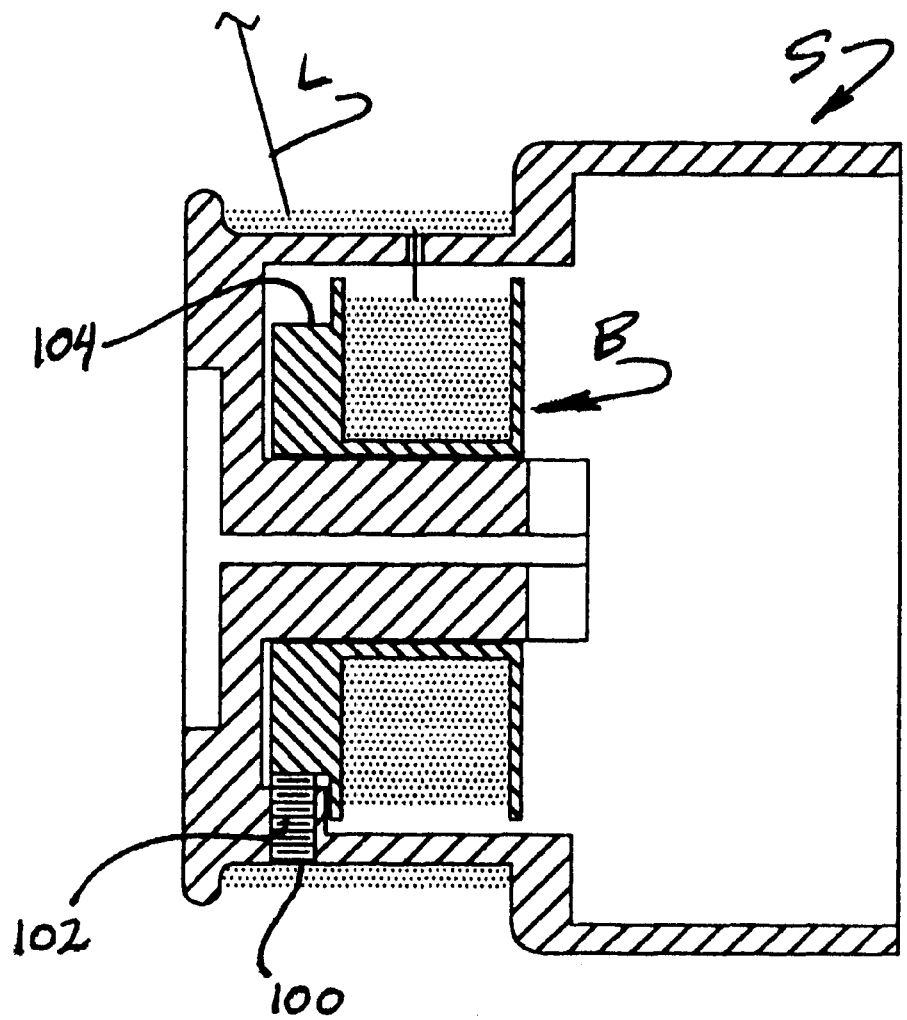
FIG. 13 is a sectional view of another alternate embodiment of an open-face reel spool and reserve bobbin constructed in accordance with the present invention.

FIG. 13 illustrates an alternate embodiment locking device LD for use with the present invention. A set screw 100 is provided in a threaded opening 102 of spool S, in a circumferential portion thereof. Set screw 100 engages a radial engagement surface 104 of bobbin B to selectively fix rotation of bobbin B with respect to spool S, during normal operation of reel 10. When it is desired to pay out additional line L from bobbin B to spool S, set screw 100 is backed outwardly slightly within threaded bore 102, such that set screw 100 disengages, or only slightly engages, bobbin B, to allow bobbin B to rotate in order to pay out line L, as needed.

Figure 14:
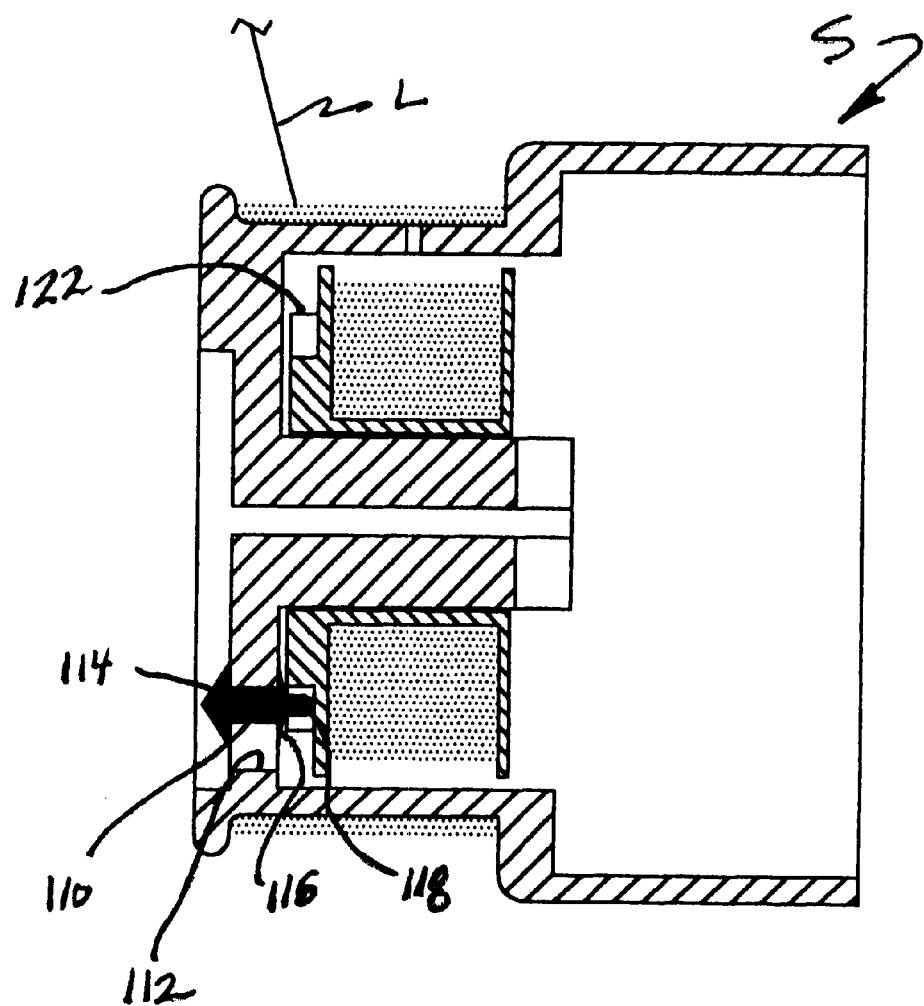
FIG. 14 is a sectional view of a further alternate embodiment of an open-face spinning reel spool and reserve bobbin constructed in accordance with the present invention.
Figure 15:
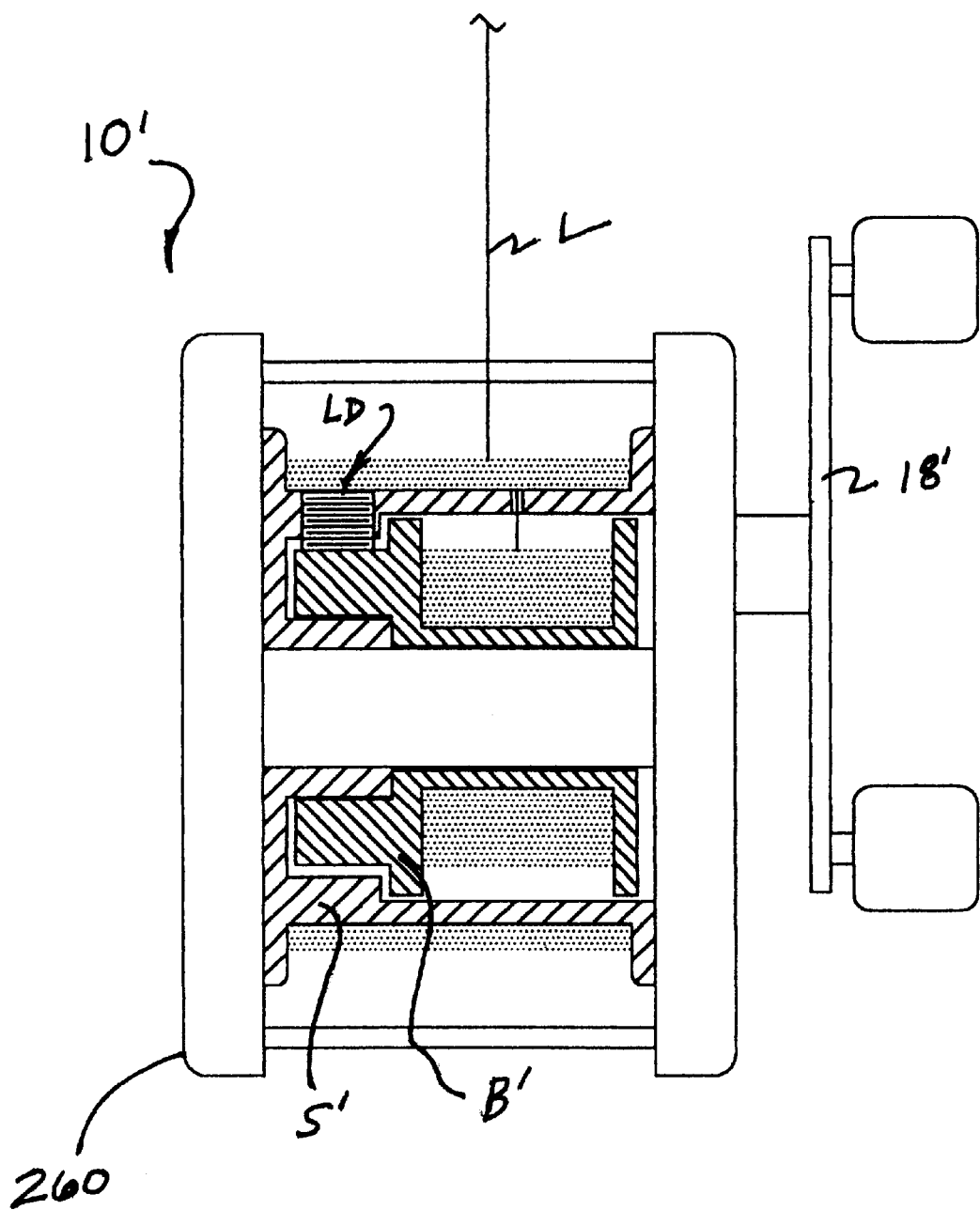
FIG. 15 is a sectional view of an alternate embodiment bait-cast reel spool and reserve bobbin constructed in accordance with the present invention.

FIG. 14 illustrates a further alternate embodiment of locking device LD. In this embodiment, locking device LD includes a sliding pin, generally 110, which is moveable radially inwardly and outwardly within a slot 112 of spool S. Pin 110 includes an enlarged head portion 114 which is a larger dimension than slot 112, such that head portion 114 prevents pin 110 from falling into slot 112. A washer 116 is fastened to pin 110 to allow sliding movement, of pin 110 within slot. 112 and to prevent pin 110 from falling outwardly from slot 112, and serves to present the end 118 of pin 110 to a groove or slot 120 provided in the circumference of a recessed portion 122 of a forward flange 64 of bobbin B. An open, raceway portion 124 is provided radially outwardly from groove 120, such that pin 110 may be moved from a bobbin locking position, as shown in FIG. 14, radially outwardly to a unlocking position, wherein end 118 of pin 110 is in raceway 124. This unlocking position allows bobbin B to rotate with respect to spool S.

FIG. 1 illustrates a further embodiment of the present invention in the form of a baitcast reel, generally 12'. Baitcast reel 12' operates on generally the same principle as does the open face spinning reel 10 discussed above, and includes a housing, generally 11, having a main spool S', reserve spool, or, bobbin B', carried in a cavity 34' and a locking device LD. A crank 18' is provided for rotating the spool in a conventional manner on a reel spool shaft 200. Reel 12' includes an open end 201 for receipt of bobbin B'.

Figure 16:
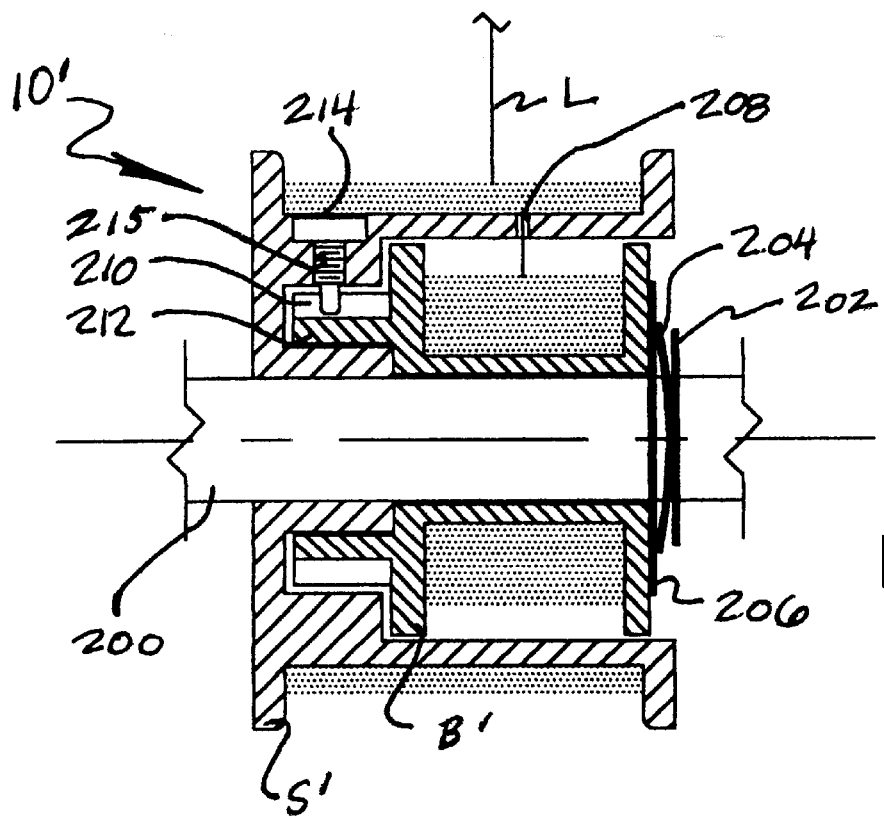
FIG. 16 is a sectional view of a further alternate embodiment bait-cast reel spool and reserve bobbin constructed in accordance with the present invention.

In one embodiment, shown in FIG. 16, spool S' is attached to spool shaft 200 using a retaining clip 202, against which a spring washer 204 bears. Although reel 12' may be constructed without using spring washer 12', if used, spring washer 204 bears against a washer 206 and applies a light pressure to the reserve line bobbin B' to prevent overrun of bobbin B' when line L is pulled therefrom. Line L passes through a passage 208 within spool S'. Bobbin B' includes grooves 210 around the circumference of a forward portion 212 thereof. Locking device LD includes a bobbin locking/release screw 214 received in bore 215 of spool S' and engages with grooves 210 of bobbin B', in order to fix bobbin B' against relative rotation with respect to spool S'. Screw 214 operates in the same manner as screw 74 to lock and unlock bobbin B'.

Figure 3:
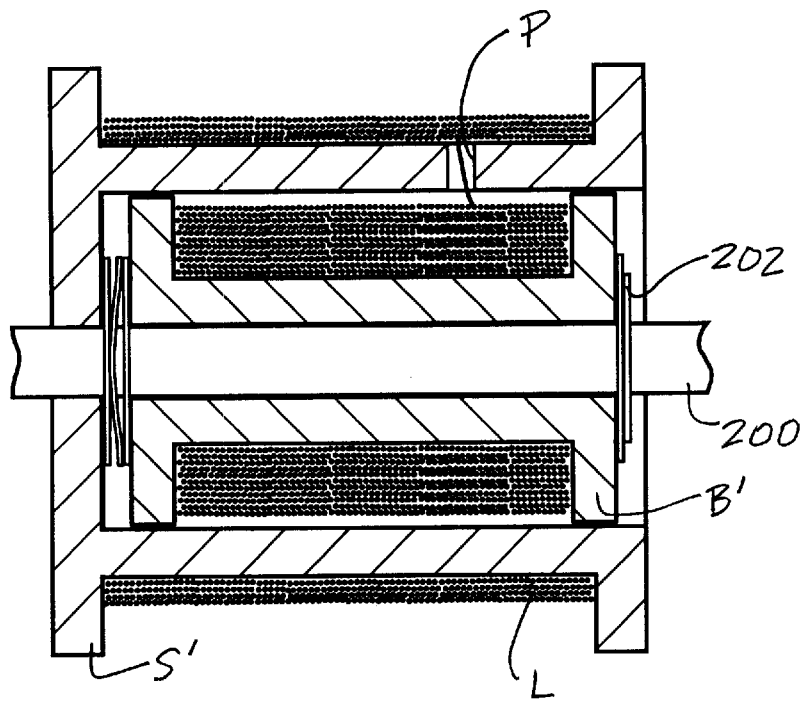
FIG. 3 is a sectional view taken along lines 3—3 of FIG. 1 of an alternate embodiment bait cast reel and bobbin constructed in accordance with the present invention.
Figure 4:
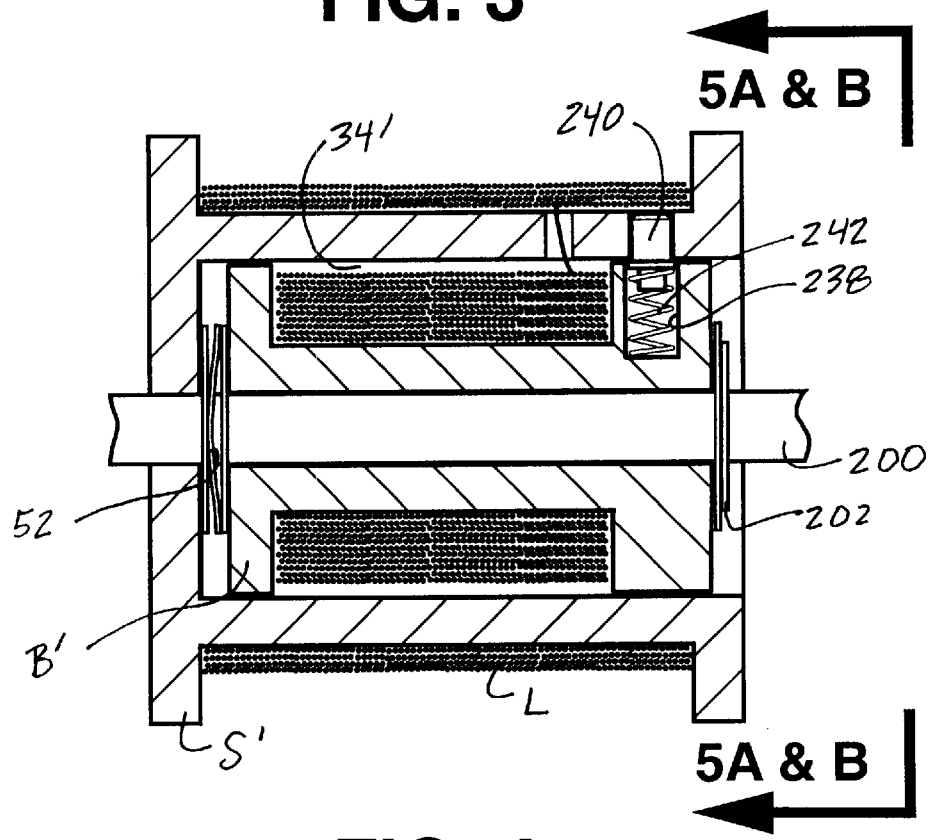
FIG. 4 is a sectional view taken along lines 4—4 of FIG. 1.

Alternately, as shown in FIG. 3, a drag system could be used with baitcast reel 12. A combination of spring washers 52, or spring washer 52/flat washer 50 combinations could be used to achieve the desired drag. Such a drag system would work as described above in regards to the implementation of the present invention in an open face reel.

Figure 17:
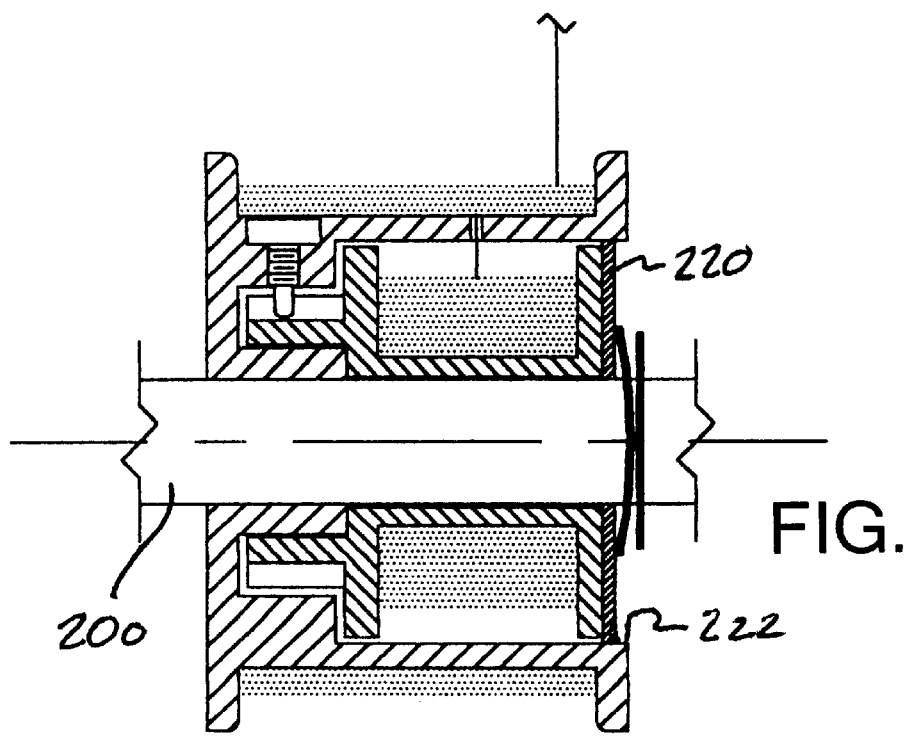
FIG. 17 is a sectional view of a still further embodiment of a bait-cast reel spool and reserve bobbin constructed in accordance with the present invention.
Figure 18:
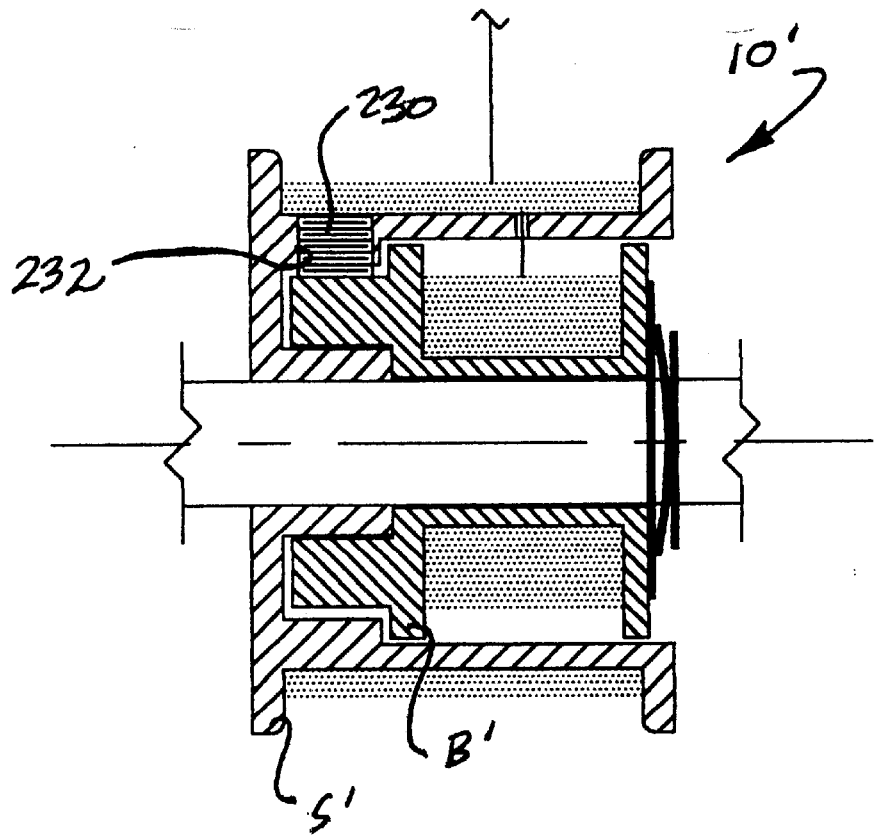
FIG. 18 is a sectional view of another alternate embodiment of a bait-cast reel spool and reserve bobbin constructed in accordance with the present invention.
Figure 19:
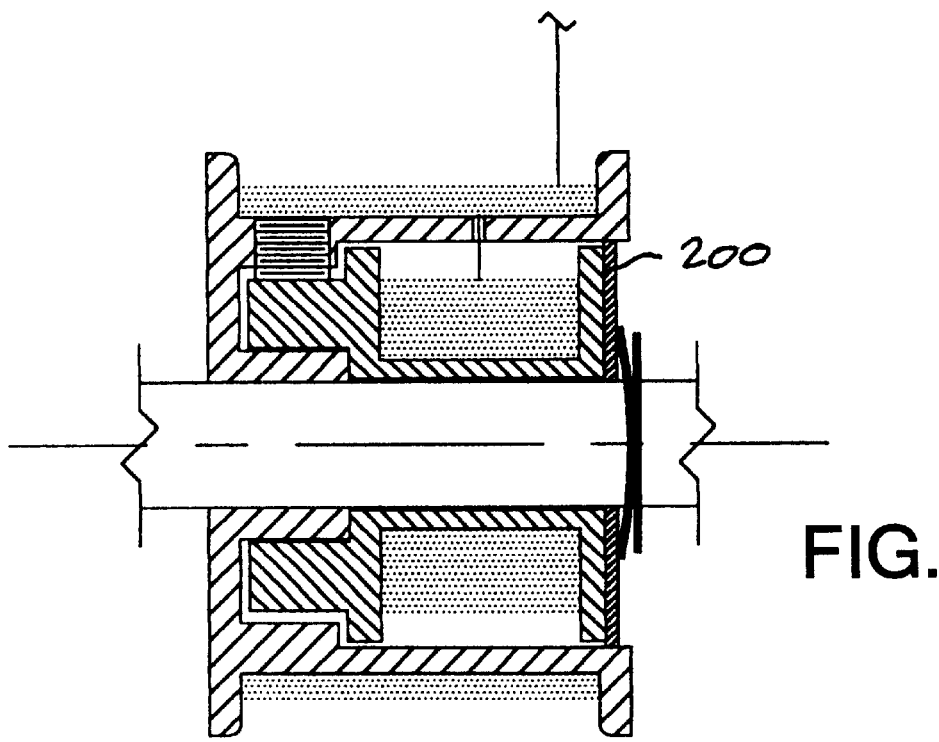
FIG. 19 is a sectional view of still another embodiment of a bait-cast reel spool and reserve bobbin constructed in accordance with the present invention.

As shown in FIGS. 17 and 19, a spool support plate 220 may be provided at an open end of spool S' to prevent distortion of spool S' at the open end 222 of spool S' when spool S' is under stress, due to tension in line L. Plate 220 is removable as necessary in order for replenishment of line L on bobbin B'.

FIGS. 15, 17, 18, and 19 illustrate an alternate embodiments of reel 12, wherein locking device LD is a set screw 230 carried within a tapped opening 232 of spool S'. Set screw 230 is tightened against reserve bobbin B' for casting and retrieving line L on the spool S', in order to prevent, or at minimum, significantly restrict, rotation of reserve bobbin B' with respect to spool S'. Set screw 230 is loosened when line L is to be pulled from reserve bobbin B', in order to provide such line to outer spool S'.

Alternately, a locking device LD, such as set screw 230 could be only partially disengaged from the bobbin in order to provide frictional resistance (and thus drag) to rotation of the bobbin B.

Figure 2:
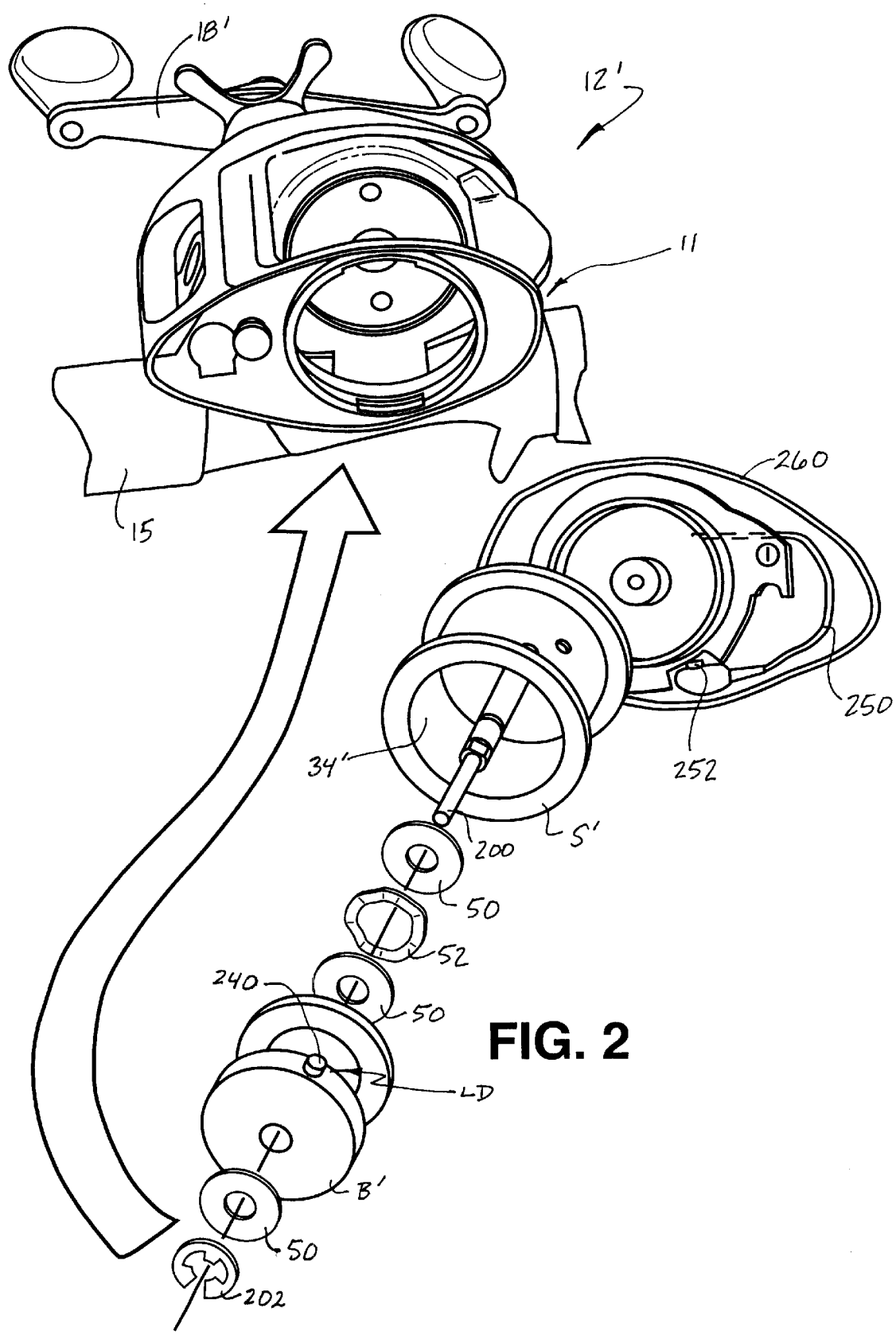
FIG. 2 is an exploded view of the bait cast reel illustrated in FIG. 1.

FIGS. 2, 5A, and 5B illustrate locking device LD is a spring loaded locking pin 240 carried in a cavity 238 in bobbin B', which is biased upwardly from bobbin B' by a spring 242 to automatically lock bobbin B' to spool S' upon alignment of pin 240 with opening 256 of spool S'. Bobbin B' is shown in a locked position in FIGS. 4 and 5A. To attain an unlocked position, a clip, generally 250, is used having a downwardly extending finger 252. Finger 252 depresses locking pin 240 downwardly such that bobbin B' may rotate with respect to spool S'. Clip 250 is of a generally C-shape and includes a curved seat portion 254 which engages spool S at a position generally diametrically opposed to an opening 256 provided in spool S', in which locking pin 240 seats when bobbin B' is in a locked position.

Clip 250 may be stored in a side panel of reel 12', such as side panel 260 when not needed for releasing bobbin B' for line retrieval.

In operation, line L is loaded on a reserve bobbin B or B' and spool S or S' by first winding line L onto the bobbin. The line, thus wound on the bobbin, is temporarily secured to the bobbin using a rubber band, clip, etc. The desired yardage of line L to be placed on the main spool is pulled from the bobbin and passed through the passage P from inside the spool. The bobbin is inserted into the spool as the rubber band is removed, and the bobbin is then allowed to seat within the spool. Locking device LD is engaged to lock the bobbin against relative movement with respect to the spool.

To increase the length of line on the main spool S or S', all the line L is cast from the main spool. The locking device LD is disengaged, such that the bobbin may rotate with respect to the spool. The desired amount of additional yardage of line is pulled from the reserve bobbin, and the locking device is then engaged to lock the bobbin with respect to the spool.

The braided lines discussed above are normally purchased in spools of one hundred to one hundred fifty yards. A fishing lure is normally cast in the range of fifteen to thirty-five yards. The bobbin/main spool combined line capacity should preferably equal at least the total yardage of line normally expected to be used on a particular reel. The spool should be proportioned to hold an amount of line equal to the length of cast required. The bobbin should be proportioned to hold the remainder of the length of line normally purchased for a particular reel.

From the foregoing, it can be seen that the present invention provides a system for meeting the objects of the invention set forth above.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of this disclosure of the invention and the following claims.

What is claimed is:

1. A fishing line dispensing device for dispensing fishing line from a fishing reel, the fishing line dispensing device comprising:
a first spool having a surface for carrying fishing line; said first spool defining a cavity and a passage extending from said surface to said cavity; and
a second spool for carrying fishing line, said second spool being configured for dispensing fishing line through said passage to said surface of said first spool.

2. The fishing line dispensing device as defined in claim 1, wherein a portion of said second spool is received within said cavity of said first spool.

3. The fishing line dispensing device as defined in claim 1, wherein said first spool said second spool are configured for use in a bait cast fishing reel.

4. The fishing line dispensing device as defined in claim 1, wherein said first spool said second spool are configured for use in an open face fishing reel.

5. The fishing line dispensing device as defined in claim 1, further comprising a lock for selectively locking said second spool to said first spool.

6. The fishing line dispensing device as defined in claim 1, further comprising a drag interface between said first spool and said second spool to allow selective relative movement between said first spool and said second spool upon a predetermined force being applied to at least one of said first spool and said second spool.

7. The fishing line dispensing device as defined in claim 1, further comprising a drag interface between said first spool and said second spool to allow selective relative movement between said first spool and said second spool upon a predetermined force being applied to the line carried on said second spool.

8. The fishing line dispensing device as defined in claim 1, further comprising a lock for automatically locking said second spool to said first spool.

9. The fishing line dispensing device as defined in claim 1, further comprising:
a spring-biased pin carried by said second spool; and
said first spool defining an opening for receipt of said spring-biased pin, for allowing the automatic locking of said second spool to said second spool upon alignment of said spring-biased pin and said opening in said first spool.

10. The fishing line dispensing device as defined in claim 1, wherein substantially the entirety of said second spool is received in said cavity of said first spool.

11. A fishing reel for dispensing fishing line from a fishing reel, the fishing reel comprising:
a support structure;
a drive mechanism connected to said support structure;
a first spool for dispensing fishing line; said first spool defining a cavity and being connected to said drive mechanism;
a crank connected to said drive mechanism for rotating said first spool to wind fishing line on said first spool;
a second spool configured for dispensing fishing line to said first spool; and
a portion of said second spool being received within said cavity of said first spool.

12. The fishing reel as defined in claim 11, wherein said support structure, said drive mechanism, and said first spool are configured for use as a bait cast reel.

13. The fishing reel as defined in claim 11, wherein said support structure, said drive mechanism, and said first spool are configured for use as an open face reel.

14. The fishing reel as defined in claim 11, wherein said second spool defines a surface for carrying the fishing line and a passage extending from said surface to said cavity of said first spool.

15. The fishing reel as defined in claim 11, further comprising a lock for selectively locking said second spool to said first spool.

16. The fishing reel as defined in claim 11, further comprising a drag interface between said first spool and said second spool to allow selective relative movement between said first spool and said second spool upon a predetermined force being applied to at least one of said first spool and said second spool.

17. The fishing reel as defined in claim 11, further comprising a drag interface between said first spool and said second spool to allow selective relative movement between said first spool and said second spool upon a predetermined force being applied to the line carried on said second spool.

18. The fishing reel as defined in claim 11, further comprising a lock for automatically locking said second spool to said first spool.

19. A fishing line dispensing device for dispensing fishing line from a fishing reel, the fishing line dispensing device comprising:
a first spool having a surface for carrying fishing line; said first spool defining a cavity;
a second spool for dispensing fishing line to said first spool; and
said second spool being received in said cavity of said first spool.

20. A fishing rod and reel combination for carrying and dispensing fishing line, the fishing rod and reel combination comprising:
an elongated rod; and
a reel, including:
a support structure;
a drive mechanism connected to said support structure;
a first spool for dispensing fishing line; said first spool defining a cavity and connected to said drive mechanism;
a crank connected to said drive mechanism for rotating said first spool;
a second spool for dispensing fishing line to said first spool; and
a portion of said second spool being received within said cavity of said first spool.

21. A method of providing fishing line to a fishing reel, the method comprising:
providing a first spool for dispensing fishing line, said first spool defining a cavity and passage in communication with said cavity;
providing a second spool for dispensing fishing line to said first spool;
winding fishing line onto said second spool;
inserting a first portion of the fishing line carried by said second spool through said passage of said first spool;
inserting at least a portion of said second spool into said cavity of said first spool; and
winding said first portion of the fishing line onto said first spool.

22. A fishing line dispensing device for dispensing fishing line from a fishing reel, the fishing line dispensing device comprising:
a first spool for dispensing fishing line;
said first spool defining a cavity and a surface for carrying the fishing line;
said first spool further defining a passage extending from said surface to said cavity of said first spool;
a second spool for dispensing fishing line to said first spool;
a drag interface between said first spool and said second spool for allowing selective relative movement between said first spool and said second spool upon a predetermined force being applied to at least one of said first spool and said second spool; and
said second spool being received within said cavity of said first spool.

23. A fishing line dispensing device for dispensing fishing line from a fishing reel, the fishing line dispensing device comprising:
a first spool for dispensing fishing line;
said first spool defining a cavity and a surface for carrying the fishing line;
said first spool further defining a passage extending from said surface to said cavity of said first spool;
a second spool for dispensing fishing line to said. first spool;
a lock for selectively locking said second spool to said first spool; and
said second spool being received within said cavity of said first spool.

* * * * *